United States Patent
Biswal et al.

(10) Patent No.: US 11,966,280 B2
(45) Date of Patent: Apr. 23, 2024

(54) METHODS AND APPARATUS FOR DATACENTER MONITORING

(71) Applicant: Walmart Apollo, LLC, Bentonville, AR (US)

(72) Inventors: Swapna Kumar Biswal, Karnataka (IN); Narendran Somasundaram, Tamil Nadu (IN); Saurabh Sandeep Jain, San Jose, CA (US); Shriniwas Phalke, Mountain House, CA (US); Satheesh Kumar Ulaganathan, Fremont, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 17/655,295

(22) Filed: Mar. 17, 2022

(65) Prior Publication Data

US 2023/0297461 A1    Sep. 21, 2023

(51) Int. Cl.
*G06F 11/00* (2006.01)
*G06F 9/455* (2018.01)
(Continued)

(52) U.S. Cl.
CPC ...... *G06F 11/0793* (2013.01); *G06F 9/45558* (2013.01); *G06F 11/0709* (2013.01);
(Continued)

(58) Field of Classification Search
CPC .............. G06F 11/0793; G06F 11/0709; G06F 11/3086; G06F 11/3423; G06F 9/45558; G06F 2009/45591
(Continued)

(56) References Cited

U.S. PATENT DOCUMENTS

| 7,669,081 B2 * | 2/2010 | Lett ........................ G06F 9/485 714/15 |
| 8,996,917 B1 * | 3/2015 | Chandramohan ... G06F 11/3696 714/28 |

(Continued)

FOREIGN PATENT DOCUMENTS

CN    110798375 B    10/2021

OTHER PUBLICATIONS

Ghaleb, "Agentless Endpoint Security Monitoring Framework", Thesis, Master of Applied Science, Department of Electrical and Computer Engineering, University of Victoria, 2019, 62 pages.
(Continued)

*Primary Examiner* — Sarai E Butler
(74) *Attorney, Agent, or Firm* — Morgan, Lewis & Bockius LLP; Manita Rawat

(57) ABSTRACT

This application relates to apparatus and methods for the monitoring of nodes within datacenters. In some examples, a computing device, such as a node, receives a monitoring file from a monitoring server, where the monitoring file includes a plurality of node health checks. The computing device is configured to execute the monitoring file based on a type of the computing device. Further, and based on the execution of the monitoring file, the computing device is configured to determine that at least one of the plurality of node health checks failed. In response to determining that the at least one of the plurality of node health checks failed, the computing device is configured to generate an alert message identifying the node health checks that failed. Further, the computing device is configured to transmit the alert message to the monitoring server for display.

19 Claims, 12 Drawing Sheets

(51) Int. Cl.
*G06F 11/07* (2006.01)
*G06F 11/30* (2006.01)
*G06F 11/34* (2006.01)

(52) U.S. Cl.
CPC ...... *G06F 11/3086* (2013.01); *G06F 11/3423* (2013.01); *G06F 2009/45591* (2013.01)

(58) Field of Classification Search
USPC ...................................................... 714/1–57
See application file for complete search history.

(56) References Cited

U.S. PATENT DOCUMENTS

| | | | | |
|---|---|---|---|---|
| 10,324,782 | B1* | 6/2019 | Dorfman | G06F 11/0727 |
| 10,541,889 | B1* | 1/2020 | Mishra | H04L 43/08 |
| 11,704,189 | B1* | 7/2023 | Magcale | H04L 41/14 |
| | | | | 714/704 |
| 2004/0153888 | A1* | 8/2004 | Kadoi | G06F 11/1482 |
| | | | | 714/57 |
| 2009/0106601 | A1* | 4/2009 | Ngai | G06F 11/0778 |
| | | | | 714/39 |
| 2011/0289344 | A1* | 11/2011 | Bae | G06F 11/202 |
| | | | | 714/E11.073 |
| 2012/0166879 | A1* | 6/2012 | Watanabe | G06F 11/0751 |
| | | | | 714/37 |
| 2012/0254669 | A1* | 10/2012 | Xia | G06F 11/0709 |
| | | | | 714/E11.202 |
| 2013/0159068 | A1* | 6/2013 | Chang | A63F 13/00 |
| | | | | 705/7.41 |
| 2013/0268805 | A1 | 10/2013 | Lee et al. | |
| 2015/0067405 | A1* | 3/2015 | Hsieh | G06F 11/3452 |
| | | | | 714/39 |
| 2015/0089304 | A1* | 3/2015 | Jeong | G06F 17/40 |
| | | | | 714/48 |
| 2015/0242300 | A1* | 8/2015 | Ivan | G06F 11/3495 |
| | | | | 714/45 |
| 2016/0048440 | A1* | 2/2016 | Williams | G06F 11/1484 |
| | | | | 714/47.1 |

OTHER PUBLICATIONS

"Enabling and Disabling Monitors and Alerts" AlertSite, Aug. 2021, 2 pages.

* cited by examiner

METHODS AND APPARATUS FOR DATACENTER MONITORING

TECHNICAL FIELD

The disclosure relates generally to datacenters such as cloud-based datacenters and, more specifically, to monitoring hardware, such as servers, within datacenters.

BACKGROUND

Some datacenters, such as cloud datacenters, may employ multiple servers to handle various data processing tasks. For example, a cloud datacenter may employ hundreds of servers to process large amounts of data. Each server may be associated with a rack of the datacenter, where a rack is a collection of servers. Datacenters may also include data storage capabilities, such as memory devices that allow for the storage of data, and networking resources that allow for communication among and with the servers. In some datacenter examples, servers may execute one or more hypervisors that run one or more virtual machines (VMs). The VMs may be scheduled to execute one or more processing tasks. To manage datacenters including the various servers, some data systems employ software tools such as Openstack®. These tools may require the installation of one or more files, such as agent plugins, on each of the servers of a datacenter that can provide information about the servers. There are opportunities to address drawbacks associated with datacenter monitoring.

SUMMARY

The embodiments described herein are directed to datacenters, such as cloud datacenters, and the monitoring of nodes (e.g., compute hosts, servers) within the datacenters. The embodiments may allow for the generation and transmission of node status information can be used to better manage the nodes of a datacenter, as well as a more efficient mechanism of obtaining information from the nodes. For example, the embodiments may include transmitting a monitoring script and one or more supporting configuration files to the nodes. The monitoring script executes locally on each node and periodically performs one or more health checks of the node. In some examples, if an issue (e.g., error) is determined, the monitoring script may perform operations to attempt to resolve the issue (e.g., self-heal operations). In some examples, if an issue persists, or if no self-heal operations are performed, the monitoring script may cause the node to generate an alert identifying the issue. The alert may be, for example, and email message to be sent to one or more predetermined email addresses, a text message to be sent to one or more predetermined destinations (phone number, etc.), a message for display, or any other suitable alert.

In some examples, the monitoring script identifies a type of the node, and performs health checks in accordance with the determined type. The embodiments may further allow for the enabling and disabling of one or more health checks for the nodes of a datacenter. For example, the embodiments may allow for the disabling of any health monitoring (e.g., the health checks performed by the monitoring script) for a particular node, for a rack (e.g., a collection of servers) of the datacenter, or for the datacenter (e.g., all the nodes of the datacenter).

Among other advantages, the embodiments may reduce the number of install files, such as plugins, required to monitor the status of nodes of a datacenter. Moreover, the embodiments may provide more robust health check information, and may perform operations to act on the health check information to more reliably and efficiently manage the nodes of the datacenter. Further, the embodiments may provide for the more efficient generation and transmission of the health check information, the benefits of which may scale as the number of monitored nodes, racks, and datacenters increase. Persons of ordinary skill in the art having the benefit of these disclosures may recognize these and other benefits as well.

In accordance with various embodiments, exemplary systems may be implemented in any suitable hardware or hardware and software, such as in any suitable computing device. For example, in some embodiments, a computing device, such as a node, is configured to receive a monitoring file, where the monitoring file includes a plurality of node health checks. The computing device is configured to execute the monitoring file based on a type of the computing device. Further, and based on the execution of the monitoring file, the computing device is configured to determine that at least one of the plurality of node health checks failed. In response to determining that the at least one of the plurality of node health checks failed, the computing device is configured to generate an alert message, where the alert message identifies the at least one of the plurality of node health checks that failed. Further, the computing device is configured to transmit the alert message to a monitoring computing device.

In some embodiments, a method includes receiving a monitoring file, where the monitoring file includes a plurality of node health checks. The method also includes executing the monitoring file based on a type of the computing device. Further, and based on the execution of the monitoring file, the method includes determining that at least one of the plurality of node health checks failed. In response to determining that the at least one of the plurality of node health checks failed, the method includes generating an alert message, where the alert message identifies the at least one of the plurality of node health checks that failed. Further, the method includes transmitting the alert message to a monitoring computing device.

In yet other embodiments, a non-transitory computer readable medium has instructions stored thereon, where the instructions, when executed by at least one processor, cause a computing device to perform operations that include receiving a monitoring file, where the monitoring file includes a plurality of node health checks. The operations also include executing the monitoring file based on a type of the computing device. Further, and based on the execution of the monitoring file, the operations include determining that at least one of the plurality of node health checks failed. In response to determining that the at least one of the plurality of node health checks failed, the operations include generating an alert message, where the alert message identifies the at least one of the plurality of node health checks that failed. Further, the operations include transmitting the alert message to a monitoring computing device.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

Figure 1:
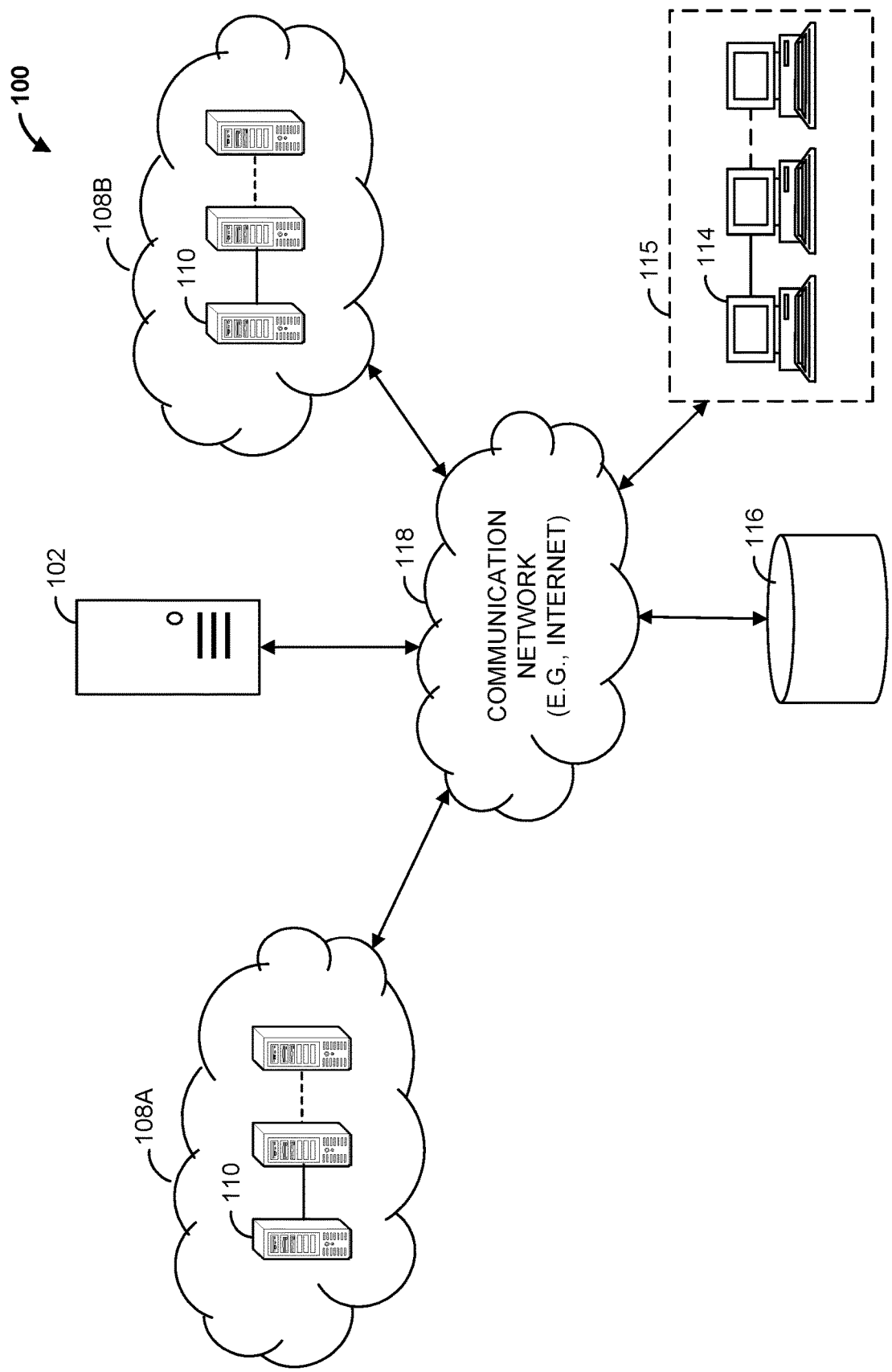
FIG. 1 is a block diagram of a datacenter management system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Turning to the drawings, FIG. 1 illustrates a block diagram of a datacenter management system 100 that includes a monitoring server 102, a database 116, datacenters 108A, 108B, and alert devices 114 communicatively coupled over network 118. Datacenters 108A, 108B may be cloud-based datacenters, for example, and may include one or more compute nodes 110 (e.g., servers). Each compute node 110 may include, for example, processing resources, such as general processing units (GPUs) or central processing units (CPUs), as well as memory devices for storing digital data.

Monitoring server 102, compute nodes 110, and alert devices 114 can each be any suitable computing device that includes any hardware or hardware and software combination that allow for the processing of data. For example, each of monitoring server 102, compute nodes 110, and alert devices 114 can include one or more processors, one or more field-programmable gate arrays (FPGAs), one or more application-specific integrated circuits (ASICs), one or more state machines, digital circuitry, or any other suitable circuitry. Each of monitoring server 102, compute nodes 110, and alert devices 114 can also include executable instructions stored in non-volatile memory that can be executed by one or more processors. For instance, any of monitoring server 102, compute nodes 110, and alert devices 114 can be a computer, a workstation, a laptop, a server such as a cloud-based server, a web server, a smartphone, or any other suitable device. In addition, each monitoring server 102, compute nodes 110, and alert devices 114 can transmit data to, and receive data from, communication network 118.

Although FIG. 1 illustrates two datacenters 108A, 108B, datacenter management system 100 can include any number of datacenters. Further, each datacenter 108A, 108B can include any number of compute nodes 110. In some examples, the compute nodes 110 are organized by racks, where each rack includes one or more compute nodes 110. For example, each compute node 110 may be configured (e.g., by monitoring server 102) to operate as part of a particular rack. Further, datacenter management system 100 can include any number of monitoring servers 102, alert devices 114, and databases 116.

Communication network 118 can be a WiFi network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

Each compute node 110 may execute one or more processing tasks, such as hypervisors that execute one or more virtual machines (VMs). For example, a compute node 110 may configure a hypervisor to execute one or more VMs. Each VM may be based on a virtual machine operating system, such as a Microsoft®, Linux®, Red Hat®, MacOS®, or any other VM operating system. Each hypervisor may run one or more of the same, or differing, VMs. Compute nodes 110 may be operable to obtain executable instructions from for example, non-volatile memory, and may execute the instructions to establish the one or more processing tasks, including the VMs. Each processing task may execute among one or more processing cores of a processor, such as a CPU, of a compute node 110. In some examples, a processing task may execute among one or more processors of a compute node 110, or among processors of multiple servers 111.

Database 116 can be any suitable non-volatile memory, such as a remote storage device, a memory device of a cloud-based server, a memory device on another application server, a memory device of a networked computer, or any other suitable non-transitory data storage device. In some examples, database 116 can be a local storage device, such as a hard drive, a non-volatile memory, or a USB stick. Database 116 may store datacenter network data such as compute node 110 status information, and may also store compute node 110 configuration data. For example, monitoring server 102 may obtain compute node 110 configuration data from database 116, and "push" the configuration data to one or more compute nodes 110 for install.

Database 116 may also store monitoring files, such as the monitoring script described herein, which may be "pushed"

by monitoring server 102 to each compute node 110. In some examples, each compute node 110 (e.g., as part of a startup/bootup sequence) may obtain the monitoring files from database 116. In some examples, each compute node 110 may obtain the monitoring files from monitoring server 102. For example, each compute node 110 may request the monitoring files from monitoring server 102 through an application interface (API) call to a particular endpoint maintained and supported by monitoring server 102.

The monitoring script may execute locally on each compute node 110 and perform operations to check the "health" of each compute node 110. For example, and as described herein, the executed monitoring script may perform operations to: check whether a previous job is still executing, check whether the compute node 110 is of a valid node type, whether all dependent files are available, whether node monitoring, or monitoring of any particular health check, is disabled, whether the node "uptime" is beyond a threshold, whether previous service processes are still executing, whether a file system is in a valid (e.g., read-only) state, whether CPU usage is beyond a threshold, whether enough disk space (e.g., memory) is available, whether disk usage is beyond a threshold, whether various services are executing, and determine container status, among other health checks.

In some examples, if an error is encountered (e.g., a health check failed), the monitoring script may attempt to "self-heal" by performing operations to cure the error. In some examples, compute nodes 110 generate an alert message identifying an error, and transmit the error message to monitoring server 102. The alert message may include, for example, a datacenter identifier (ID), a node ID, an alert code, where the alert code identifies the error. In some examples, the alert message is an email. The compute node 110 may generate the email to one or more predetermined email addresses. For example, the email may be viewed on a display of one or more of monitoring server 102 and alert devices 114. Alert devices 114 may be operated by a datacenter management department 115 that employs one or more information technology (IT) professionals, for example.

In some examples, a user may, via one or more of monitoring server 102 and alert devices 114, disable, or enable, one or more health checks performed by the executed monitoring script. For example, an alert device 114 may display a digital interface that identifies each datacenter 108A, 108B, racks within each datacenter 108A, 108B, and nodes assigned to each rack. The digital interface may further include icons that, when engaged by the user, allow the user to disable or enable one or more health checks for one or more datacenters 108A, 108B (e.g., for a cloud region), a rack of a datacenter 108A, 108B, or a node of a datacenter 108A, 108B.

In some embodiments, a compute node 110 is configured to receive a monitoring file, where the monitoring file includes a plurality of node health checks. The compute node 110 is configured to execute the monitoring file based on a type of the computing device. Further, and based on the execution of the monitoring file, the compute node 110 is configured to determine that at least one of the plurality of node health checks failed. In response to determining that the at least one of the plurality of node health checks failed, the compute node 110 is configured to generate an alert message, where the alert message identifies the at least one of the plurality of node health checks that failed. Further, the compute node 110 is configured to transmit the alert message to monitoring server 102.

In some examples, the compute node 110 is configured to determine whether each of the plurality of node health checks are enabled, and execute each of the plurality of node health checks when they are enabled.

In some examples, in response to determining that the at least one of the plurality of node health checks failed, the compute node 110 is configured to execute again the at least one of the plurality of node health checks that failed after a predetermined amount of time.

In some examples, the compute node 110 is configured to determine that a first of the plurality of node health checks passed, and based on the determination, execute a second of the plurality of node health checks.

In some examples, the compute node 110 is configured to determine that a first of the plurality of node health checks failed, and exit the monitoring script.

In some examples, the compute node 110 is configured to determine that the type of the computing device does not match any of a plurality of node types identified within the monitoring script, generate a second alert message identifying an unsupported node type, transmit the second alert message, and exit the monitoring script.

In some examples, the alert message is an email message to a predetermined email address.

In some examples, executing the monitoring file comprises executing an operating system (OS) that calls the monitoring file.

Figure 2:
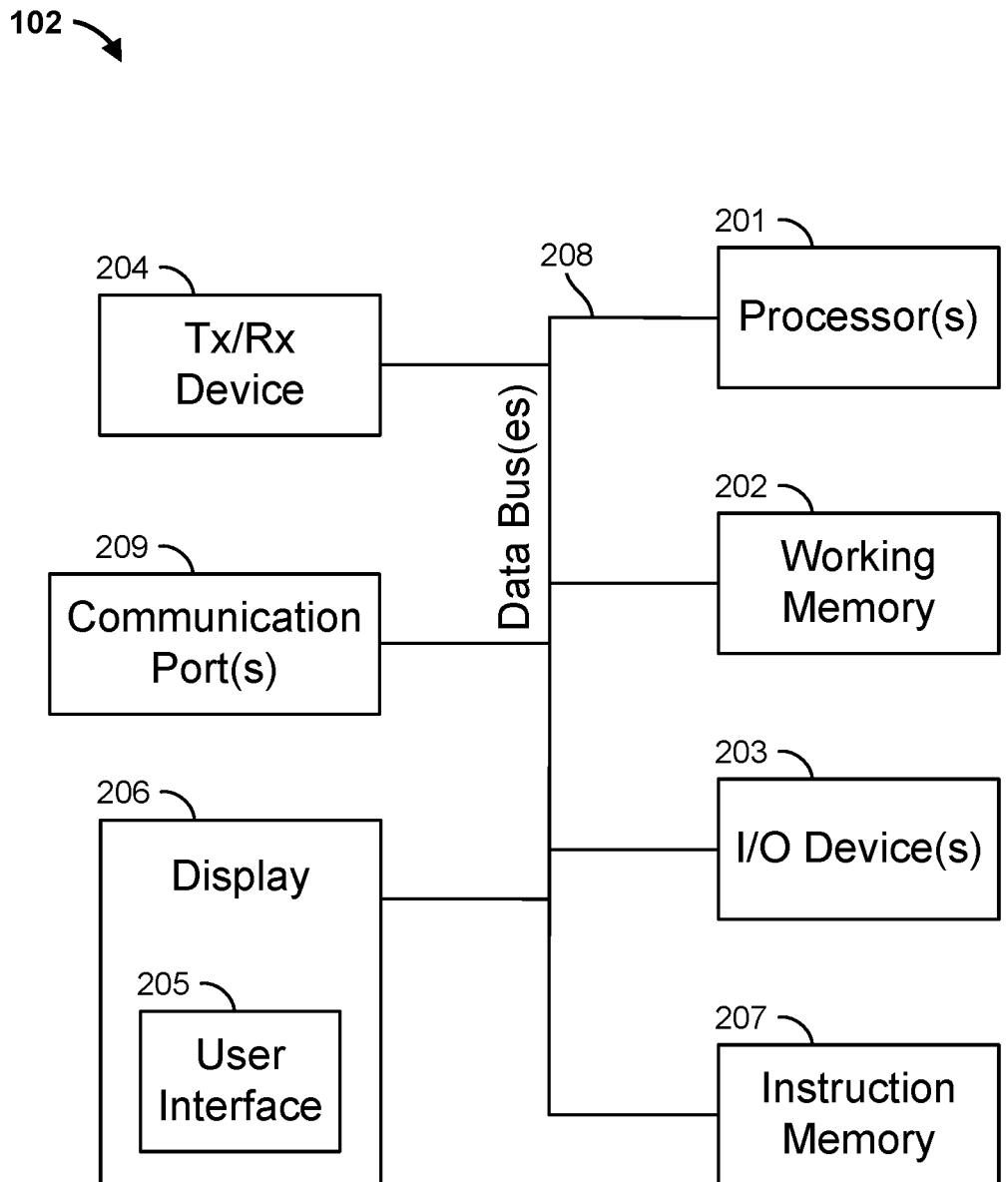
FIG. 2 is a block diagram of an exemplary monitoring server in accordance with some embodiments.

FIG. 2 illustrates the monitoring server 102 of FIG. 1. Monitoring server 102 can include one or more processors 201, working memory 202, one or more input/output devices 203, instruction memory 207, a transceiver 204, one or more communication ports 207, and a display 206, all operatively coupled to one or more data buses 208. Data buses 208 allow for communication among the various devices. Data buses 208 can include wired, or wireless, communication channels.

Processors 201 can include one or more distinct processors, each having one or more processing cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 201 can be configured to perform a certain function or operation by executing the instructions stored on instruction memory 207 embodying the function or operation. For example, processors 201 can be configured to perform one or more of any function, method, or operation disclosed herein.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of monitoring server 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 209 can include, for example, a serial port such as a universal asynchronous receiver/transmitter (UART) connection, a Universal Serial Bus (USB) connection, or any other suitable communication port or connection. In some examples, communication port(s) 209 allows for the programming of executable instructions stored in instruction memory 207. In some examples, communication port(s) 209 allow for the transfer (e.g., uploading or downloading) of data, such as datacenter configuration files.

Display 206 can display user interface 205. User interfaces 205 can enable user interaction with monitoring server 102. For example, user interface 205 can be a user interface for an application of a retailer that allows a customer to initiate the return of an item to the retailer. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 monitoring server 102 will be operating in. Processor(s) 201 is operable to receive data from, or send data to, a network, such as communication network 118 of FIG. 1, via transceiver 204.

Figure 3:
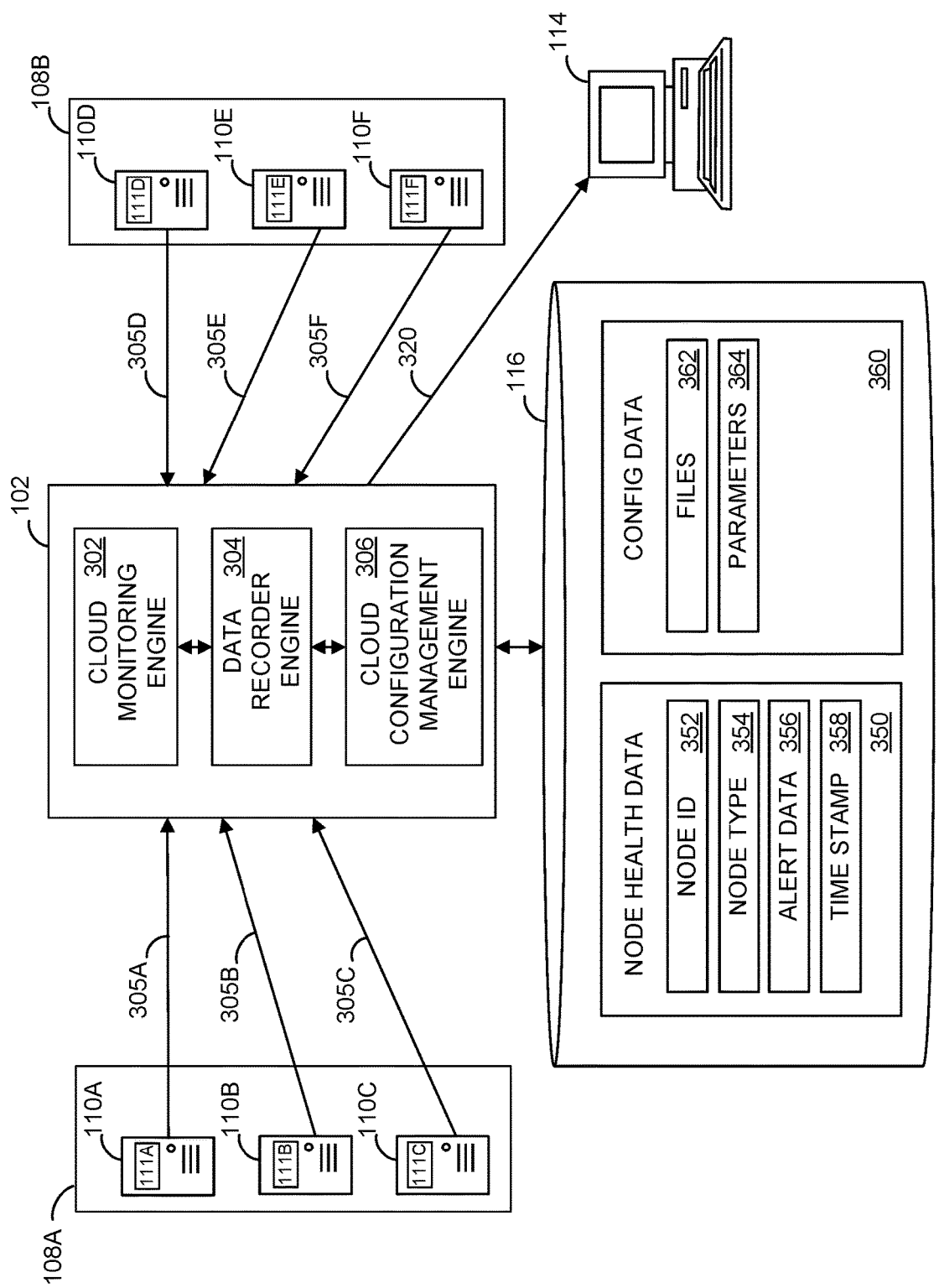
FIG. 3 is a block diagram illustrating examples of various portions of the datacenter management system of FIG. 1 in accordance with some embodiments.

FIG. 3 is a block diagram illustrating examples of various portions of the datacenter management system 100 of FIG. 1. As indicated in FIG. 3, monitoring server 102 is communicatively coupled to database 116 and alert device 114. Further, monitoring server 102 is communicatively coupled to compute nodes 110A, 110B, 110C of datacenter 108A, and compute nodes 110D, 110E, 110F of datacenter 108B. For example, monitoring server 102 may store data to, and retrieve data from, database 116. Monitoring server 102 may also transmit data to, and receive data from, each compute node 110A, 110B, 110C of datacenter 108A, each compute node 110D, 110E, 110F of datacenter 108B, and alert device 114.

In this example, monitoring server 102 includes a cloud monitoring engine 302, a data recorder engine 304, and a cloud configuration management engine 306. In some examples, each of cloud monitoring engine 302, data recorder engine 304, and cloud configuration management engine 306 are implemented in hardware. In some examples, each of cloud monitoring engine 302, data recorder engine 304, and cloud configuration management engine 306 are implemented by the execution of instructions by one or more processors, such as by processor 201 executing instructions stored in instruction memory 207.

Database 116 stores node health data 350 for each compute node 110, which may include a node ID 352 and a node type 354 for each compute node 110 of each datacenter 108A, 108B. Database 116 further stores configuration data 360 that may include one or more files 362, including a monitoring script, and one or more parameters 364. The monitoring script may include, for example, one or more health checks. Each compute node 110 may obtain, during bootup, at least portions of configuration data 360, which may include the monitoring script, and may execute the monitoring script. For example, in response to a request, cloud configuration management engine 306 may be configured to obtain at least portions of configuration data 360, which may include the monitoring script, from database 116, and may transmit the portions of configuration data 360 to the requesting compute node 110. In some examples, as described herein, cloud configuration management engine 306 may transmit the portions of configuration data 360 to each compute node 110 periodically.

For example, and as described herein, each compute node 110A, 110B, 110C, 110D, 110E, 110F may execute the monitoring script to perform the one or more health checks of the corresponding compute node 110. The monitoring script may be loaded during a boot sequence of the corresponding compute node 110. For example, each compute node 110 may obtain the monitoring script from monitoring server 102 during the boot sequence, and an operating system (OS) of the compute node 110 may periodically execute the monitoring script. In some examples, the OS runs the monitoring script every few minutes, such as every 5, 10, 15, or 60 minutes.

The monitoring script may include one or more health checks, such as one or more of the following: a check of whether a previous job is still executing, a check of whether the compute node 110 is of a valid node type, a check of whether all dependent files are available, a check of whether node monitoring, or monitoring of any particular health check, is disabled, a check of whether the node "uptime" is beyond a threshold, a check of whether previous service processes are still executing, a check of whether a file system is in a valid (e.g., read-only) state, a check of whether CPU usage is beyond a threshold, a check of whether enough disk space (e.g., memory) is available, a check of whether disk usage is beyond a threshold, a check of whether various services are executing, and a determination of container status, among others. In this example, cloud monitoring engine 302 may receive, from each compute node 110A, 110B, 110C, 110D, 110E, 110F, a corresponding alert message 305A, 305B, 305C, 305D, 305E, 305F if one or more of the health checks fail.

For example, for the check of whether a previous job is still executing, the executed monitoring script may generate an alert message 305 if a previous job, such as one previously assign to the compute node 110, is still under operation. If the previous job is not running, the executed monitoring script may proceed to the next health check. Otherwise, if the previous job is still running, the executed monitoring script may kill the previous job process and, in some examples, schedule, or launch, a new job process. Further, the executed monitoring script may generate an alert message 305 identifying that the previous job has been terminated (e.g., via an alert code).

For the check of whether the compute node 110 is of a valid node type, an alert message 305 may be generated if a configured node type for the compute node 110 is not of a predetermined node type. For example, the executed monitoring script may compare the node type of the compute node 110 (which may be a parameter 364) to one of a plurality of node types defined in the monitoring script. For example, the monitoring script may define controller, deployment, and compute node types, where nodes of each type perform particular operations. If the node type of the compute node 110 is not one of the controller, deployment, and compute node types, the executed monitoring script may generate an alert message 305 identifying that the configured node type of the compute node 110 is invalid. In some examples, the compute node 110 also stops executing (e.g., exits) the monitoring script. Otherwise, if the node type of the compute node 110 is one of the controller, deployment, and compute node types, the executed monitoring script may proceed to the next health check.

In some examples, and based on the configured node type (when the node type is valid), the executed monitoring script may determine a set of health checks to perform on the compute node 110. For example, the monitoring script may perform a first set of health checks for controller node type compute nodes 110, a second set of health checks for deployment node type compute nodes 110, and a third set of health checks for compute node type compute nodes 110. Some health checks may be included in two or more of the set of health checks.

The compute node 110 may further generate an alert message 305 if all dependent files, which may be define within one of the files 362, are available (e.g., within a directory of a file system of compute node 110). Dependent files may include, for example, a predetermined number of files deemed necessary for operation. If any of the dependent files are missing (e.g., not within the directory), the executed monitoring script may cause the execution of a "re-install" script to attempt to recover the missing files. Once complete, the executed monitoring script may check again to determine if the predetermined number of files are located within the directory. If the files are still not available, the executed monitoring script may generate an alert message 305. Otherwise, the executed monitoring script may proceed to the next health check.

In some examples, the executed monitoring script determines if a particular health check is disabled. For example, at least one of the files 362 may identify health checks that have been disabled for either the particular compute node 110 (e.g., using a node ID), for a rack of the particular compute node 110, or for the datacenter 108A, 108B of the compute node 110. If a particular health check is disabled, the executed monitoring script does not perform the health check (e.g., the health check is skipped).

In some examples, a user may provide input to a particular compute node 110 to disable a health check. For example, the user may modify a configuration file locally stored within the compute node 110, such as one obtained from files 362 of configuration data 360 during bootup, to disable a particular health check. If the health check is disabled, as noted above, the executed monitoring script will not perform the health check. However, in some examples, each compute node 110 overwrites the modified configuration file with a "clean" version (e.g., the one received at bootup, or one pushed to, or pulled by, the compute node 110 after startup) periodically. As such, if the particular health check is enabled in the "clean" version of the file, the particular health check will be performed during the next execution of the monitoring script.

In some examples, the executed monitoring script may determine if an uptime of the compute node 110 (e.g., amount of time since the compute node 110 booted up) is greater than a predetermined threshold. If the uptime is not greater than the predetermined threshold, the executed monitoring script exits, and is re-run the next time it is invoked (e.g., by the OS). As such, the monitoring script may not execute fully if the uptime of the compute node 110 is not at least the predetermined threshold. The predetermined threshold may be received as a parameter 364. For example, the parameter 364 may be obtained at bootup during the bootup sequence of the compute node 110.

In some examples, the executed monitoring script may determine if a load average of the compute node 110 (e.g., number of processes using or waiting for a processing core) is greater than a predetermined threshold. If the load average is not greater than the predetermined threshold, the executed monitoring script proceeds to the next health check. If, however, the load average is the same or greater than the predetermined threshold, the executed monitoring script may generate an alert message 305.

In some examples, the executed monitoring script may determine if CPU usage of the compute node 110 (e.g., percent of time a CPU is processing) is greater than a predetermined threshold. If the CPU usage is not greater than the predetermined threshold, the executed monitoring script proceeds to the next health check. If, however, the CPU usage is the same or greater than the predetermined threshold, the executed monitoring script may generate an alert message 305.

In some examples, the executed monitoring script may determine whether a service process is still executing (e.g., so not completed). For example, the executed monitoring script may determine that the service process is still executing, and may initiate a timer for a predetermined amount of time (e.g., five minutes). The predetermined amount of time may be received as part of the parameters 364. The executed monitoring script may determine when the time expires (e.g., the executed monitoring script may pool the time, or may receive a signal from the timer when the timer expires), and may check again whether the service process is still executing. If the service process is still executing, the executed monitoring script may generate an alert message 305 identifying that the service process is still running. In some examples, the executed monitoring script may attempt to self-heal by, for example, attempting to end the service process. If successful (e.g., the service process ended), the executed monitoring script may proceed to the next health check. Otherwise, if not successful, the executed monitoring script may generate the alert message 305.

In some examples, as described above, the services processes checked by the executed monitoring script depend on the node type of the corresponding compute node 110. For example, the monitoring script may determine whether a first set of service process are executing for controller node type compute nodes 110, a second set of service process are executing for deployment node type compute nodes 110, and a third set of service process are executing for compute node type compute nodes 110.

In some examples, for compute nodes 110 of a particular node type, such as deployment and controller node types, the executed monitoring script may determine whether one or more file directories are configured as read-only. The identification of the file directories may be predetermined and defined within files 362. If the file directories are read-only, the executed monitoring script may proceed to the next health check. Otherwise, the executed monitoring script may generate an alert message 305 identifying that the file directories are not read-only.

In some examples, the executed monitoring script may determine a usage of disk space, such disk space usage of directories mounted on one or more disks (e.g., /root, /boot directories) of the corresponding compute node 110. If the disk space usage is below a predetermined threshold (e.g., 75%), the executed monitoring script may proceed to the next health check. The predetermined threshold may be defined within parameters 364. If, however, the disk space usage is at or above the predetermined threshold, the executed monitoring script may attempt a self-heal by performing cleanup operations, such as deleting files in the directories. Once the cleanup operations are complete, the executed monitoring script may again determine the disk space usage. If the disk space usage is now below the predetermined threshold (e.g., 75%), the executed monitoring script may proceed to the next health check. Otherwise, the executed monitoring script may generate an alert message 305 identifying that the disk space usage is at or above the threshold. In some examples, the alert message 305 includes the disk space usage.

In some examples, the executed monitoring script may determine memory usage, such as amount of working memory currently utilized. If the memory usage is above a predetermined threshold (e.g., 25%), the executed monitoring script may proceed to the next health check. The predetermined threshold may be defined within parameters 364. If, however, the memory usage is at or below the predetermined threshold, the executed monitoring script may generate an alert message 305 identifying that the memory usage is at or below the threshold. In some examples, the alert message 305 includes the memory usage.

In some examples, the executed monitoring script may determine whether a keep-alive process is executing, such as without error. The keep-alive process may include, for example, checking a keep-alive value stored in memory. The keep-alive value may be set upon the reception of a message or signal, and the periodic verification of the set value. For example, upon the expiration of an amount of time, the keep-alive value may be checked. If the keep-alive value is not set in accordance with a received message or signal, a keep-alive status may be set to indicate a failure. Otherwise, if the keep-alive value is set in accordance with the received message or signal, the keep-alive status may be set to indicate a passing status, and the keep-alive value may be cleared (e.g., to allow the setting of the keep-alive value upon the next received message or signal). The executed monitoring script may determine whether the keep-alive process is executing without error based on the keep-alive status. For example, the executed monitoring script may determine that the keep-alive process is not executing without error if the keep-alive status indicates a failure. If the executed monitoring script determines the keep-alive process is executing without error, the executed monitoring script may proceed to the next health check. If, however, the executed monitoring script determines the keep-alive process failed, the executed monitoring script may attempt to self-heal by restarting the keep-alive process. If, after restraint the keep-alive process, the keep-alive process again indicates failure, the executed monitoring script may generate an alert message 305.

After the final health check is performed, the executed monitoring script may wait until the next periodic health check is performed. In some examples, the monitoring script may be executed (e.g., by the compute node's 110 OS) every few minutes, such as every 5, 10, 15, or 60 minutes. Further, as described herein, monitoring server 102 may receive, from each compute node 110A, 110B, 110C, 110D, 110E, 110F, one or more corresponding alert messages 305A, 305B, 305C, 305D, 305E, 305F if one or more of the health checks fail.

Monitoring server 102 may generate alert data 356 for each compute node 110 based, at least in part, on the corresponding received alert messages 305. For example, monitoring server 102 may parse a received alert message 305 to determine alert data 356, which may include an alert code. Monitoring server 102 may also determine a timestamp 358 identifying when the alert message 305 was received. For example, monitoring server 102 may read an internal clock register upon receiving an alert message 305 to determine the timestamp 358, or may obtain the timestamp 358 over network 118 from a time provider (e.g., a server that provides current dates/times) upon receiving an alert message 305. Monitoring server 102 may store the alert data 356 and timestamp 358 in database 116 for the corresponding compute node 110 identified by node ID 350. In some examples, monitoring server 102 may display at least portions of the node health data, such as by displaying the portions within user interface 205.

In some examples, monitoring server 102 generates an alert notice 320, which may include portions of node health data 350. For example, alert notice 320 may include node ID 350 and alert data 356 corresponding to a particular received alert message 305. In some examples, the alert notice 320 may also include the node type 354 of the reporting compute node 110, and the timestamp 358 of when the alert message 305 was received. Monitoring server 102 may transmit the alert notice 320 to one or more alert devices 114. In some examples, the alert notice 320 is an email message with a destination address of one or more predetermined email addresses.

Figure 4:
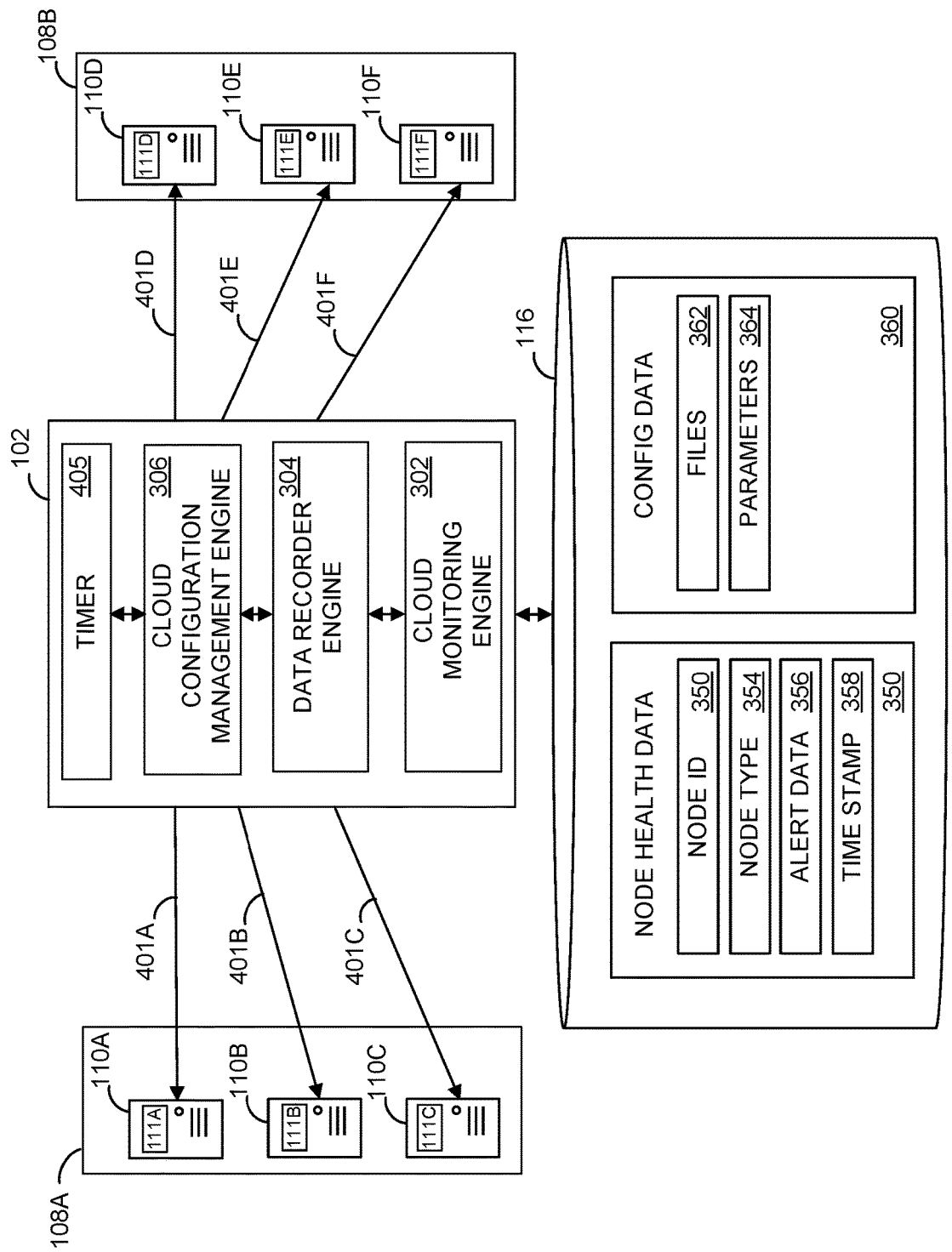
FIG. 4 is another block diagram illustrating examples of various portions of the datacenter management system of FIG. 1 in accordance with some embodiments.

FIG. 4 is a block diagram illustrating examples of various portions of the datacenter management system 100 of FIG. 1. As indicated in FIG. 4, cloud configuration management engine 306 of monitoring server 102 may transmit (e.g., push), to each compute node 110A, 110B, 110C of datacenter 108A, and each compute node 110D, 110E, 110F of datacenter 108B, a corresponding monitoring package 401A, 401B, 401C, 401D, 401E, 401F. Each monitoring package 401 may include, for example, a monitoring script obtained from files 362, as well as one or more parameters 364. Each monitoring package 401 may also include the node ID 350 of the corresponding compute node 110, and the node type 354 of the corresponding compute node 110.

In some examples, each compute node 110 configures itself to be of the node type 354 received in the monitoring package 401. Each compute node 110 may also configure thresholds, such as those discussed herein, based on the received parameters 364. Further, each compute node 110 may install a received monitoring script in a directory to be called, for example, by the compute node's 110 OS.

In some examples, each compute node 110 requests their corresponding monitoring package 401 as part of a bootup sequence. For example, each compute node 110 may poll an API endpoint maintained by monitoring server 102 to request the monitoring package 401 (e.g., API "pull"). In response, cloud configuration management engine 306 may transmit the requested monitoring package 401. In some examples, cloud configuration management engine 306 transmits the monitoring package 401 to each compute node 110 periodically (e.g., once a day, once an hour, once a month, etc.). For example, cloud configuration management engine 306 may initialize a timer 405 to a predetermined amount of time (e.g., which may be configured by a user and stored in database 116), and may start the timer 405. Upon the timer 405 expiring (e.g., reaching 0), cloud configuration management engine 306 may transmit the monitoring packages 401 to each of the compute nodes 110.

Figure 5:
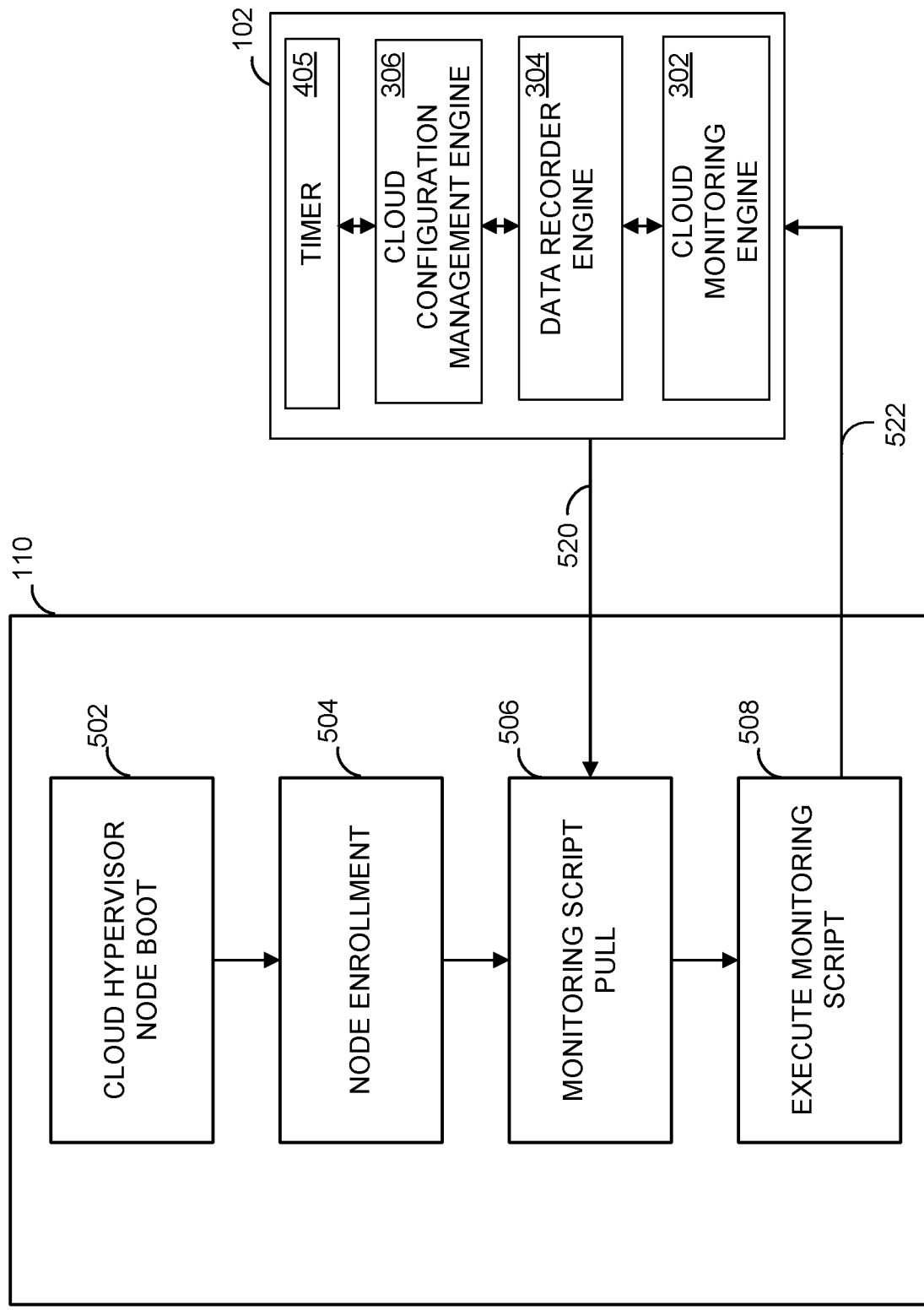
FIG. 5 is yet another block diagram illustrating examples of various portions of the datacenter management system of FIG. 1 in accordance with some embodiments.

FIG. 5 illustrates a block diagram of an exemplary monitoring server 102 in communication with an exemplary compute node 110. FIG. 5 further illustrates bootup steps (e.g., a bootup sequence) of the compute node 110. For example, at startup (e.g., bootup), the compute node 110 may execute a cloud hypervisor node boot 502, which includes operations to boot one or more hypervisors on the compute node 110. Further, the compute node may execute operations to perform a node enrollment 504, which may include performing operations to register the compute node 110 with the monitoring server 102 as a particular node type (e.g., node type 354).

In addition, the compute node 110 may perform monitoring script pull 506 operations to obtain, from monitoring server 102, monitoring files 520 (e.g., files 362, parameters 364) such as the monitoring script described herein. For example, the compute node 110 may perform an API call destined to a particular endpoint supported by monitoring server 102, and in response receive the monitoring script as well as any corresponding parameters, such as the thresholds described herein.

Further, the compute node 100 may execute the monitoring script 508 as described herein. For example, the compute node 110 may execute the monitoring script to perform a plurality of health checks of the compute node 110 periodically. If any of the health checks fail (e.g., a fault or error is detected), the compute node 110 may generate an alert message 522 characterizing the failure, and may transmit the alert message 522 to monitoring server 102.

Figure 6A:
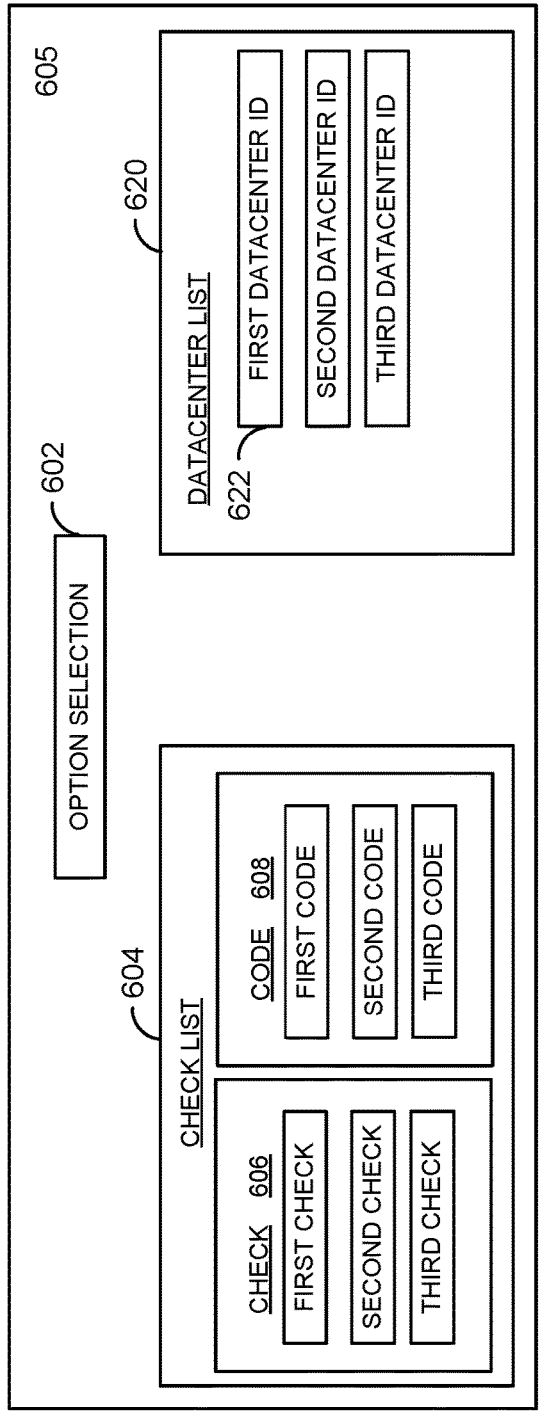
FIGS. 6A, 6B, 6C, and 6D illustrate examples of digital interfaces that may be provided for display in accordance with some embodiments.

FIGS. 6A, 6B, 6C, and 6D illustrate examples of digital interfaces that may be provided for display by, for example, monitoring server 102 or alert device 114. For example, FIG. 6A illustrates a digital interface 605 that includes an option selection icon 602, a checklist 604, and a datacenter list 620. Datacenter list 620 may identify one or more datacenters, such as datacenters 108A, 108B, by datacenter IDs 622. For example, datacenter list 620 may identify a first datacenter with a first datacenter ID, a second datacenter with a second datacenter ID, and a third datacenter with a third datacenter ID.

Checklist 604 may identify health checks 606 and corresponding codes 608. Each code 608 may be a value that identifies a corresponding health check 606 performed by a compute node 110. For example, a first code (e.g., 0x0001) may identify a first health check, a second code (e.g., 0x0010) may identify a second health check, and a third code (e.g., 0x0100) may identify a third health check.

Figure 6B:
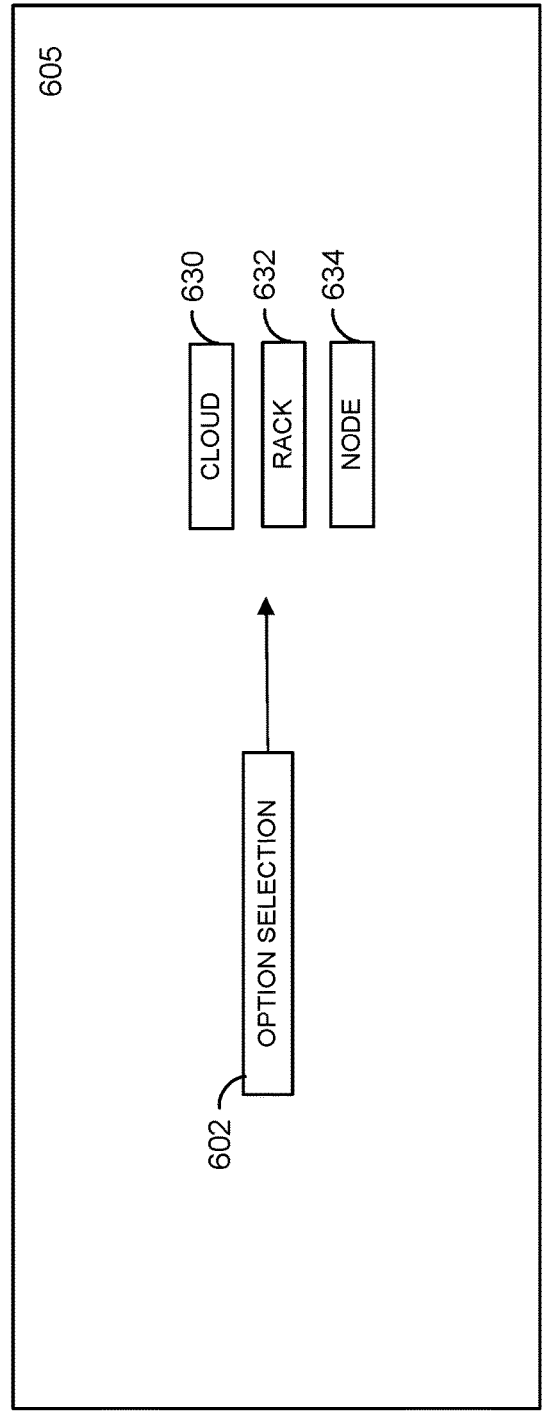

Option selection icon 602 allows a user to enable, or disable, any health checks 606 for any datacenter identified in the datacenter list 620, or any compute node or rack of any of the identified datacenters. A user may select one or more of the health checks, and one or more of the datacenters of the datacenter list (e.g., by engaging the corresponding health checks 606 and datacenter ID 622 icons). Further, the user may engage the option selection icon 602 of digital interface 605 to select whether to apply the change to the selected cloud 630 (e.g., the selected datacenter), a rack 632 of the selected datacenter, or a node 634 of the selected datacenter, as illustrated in FIG. 6B. Further, if engaging rack icon 632 or node icon 634, the digital interface may provide an additional menu allowing the user to select one or more racks, or one or more nodes, of the selected datacenter.

Figure 6C:
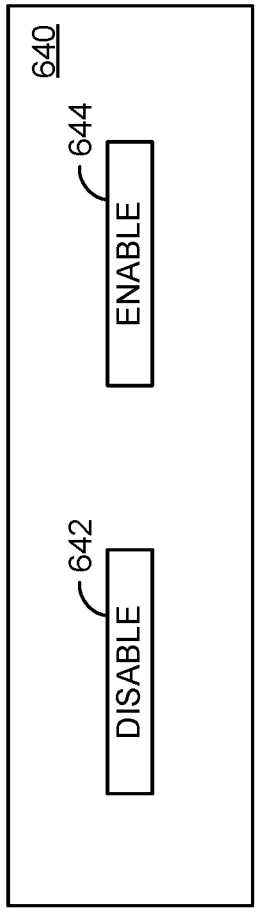

FIG. 6C illustrates a digital interface 640 that allows the user to select whether to disable, or enable, the selected health checks for the selected datacenters, racks, and nodes. For example, the user may disable the selected health checks by engaging the disable icon 642. Alternatively, the user may enable the selected health checks by engaging the enable icon 644.

Figure 6D:
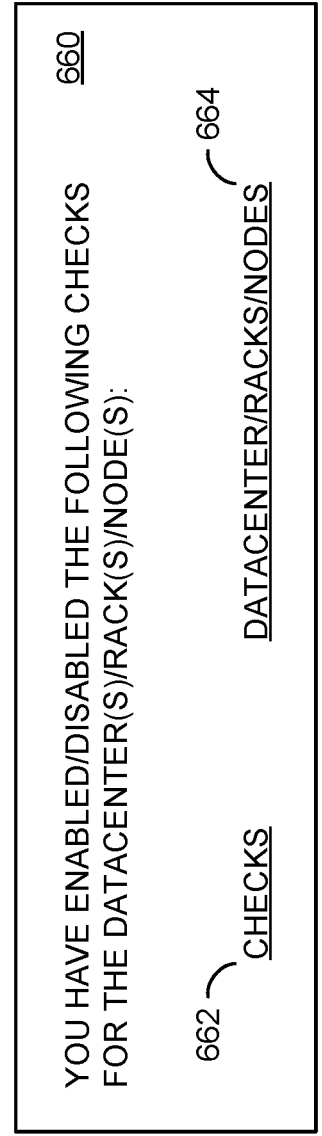

Upon engaging the disable icon 642 or enable icon 644, as illustrated in FIG. 6D, a digital interface 660 may be displayed that identifies the health checks 662 to be disabled or enabled for the selected datacenters, racks, and nodes 664.

If a datacenter is selected, monitoring server 102 selects all compute nodes 110 for the datacenter. If a rack is selected, monitoring server 102 selects all compute nodes 110 belonging to the selected rack of the datacenter. Further, monitoring server 102 may transmit (e.g., push) a notification to the corresponding compute nodes 110, causing the compute nodes 110 to enable or disable the health checks. For example, monitoring server 102 may adjust one or more parameters 364 to indicate whether the selected health checks 662 are enabled or disabled, and may transmit the one or more parameters 364 to the corresponding compute nodes 110. In some examples, monitoring server 102 may transmit the one or more parameters 364 to the corresponding compute nodes 110 periodically (e.g., upon the expiration of timer 405). In some examples, monitoring server 102 may transmit the one or more parameters 364 to a corresponding compute node 110 upon receiving a request (e.g., API pull) from the compute node 110.

Figure 7:
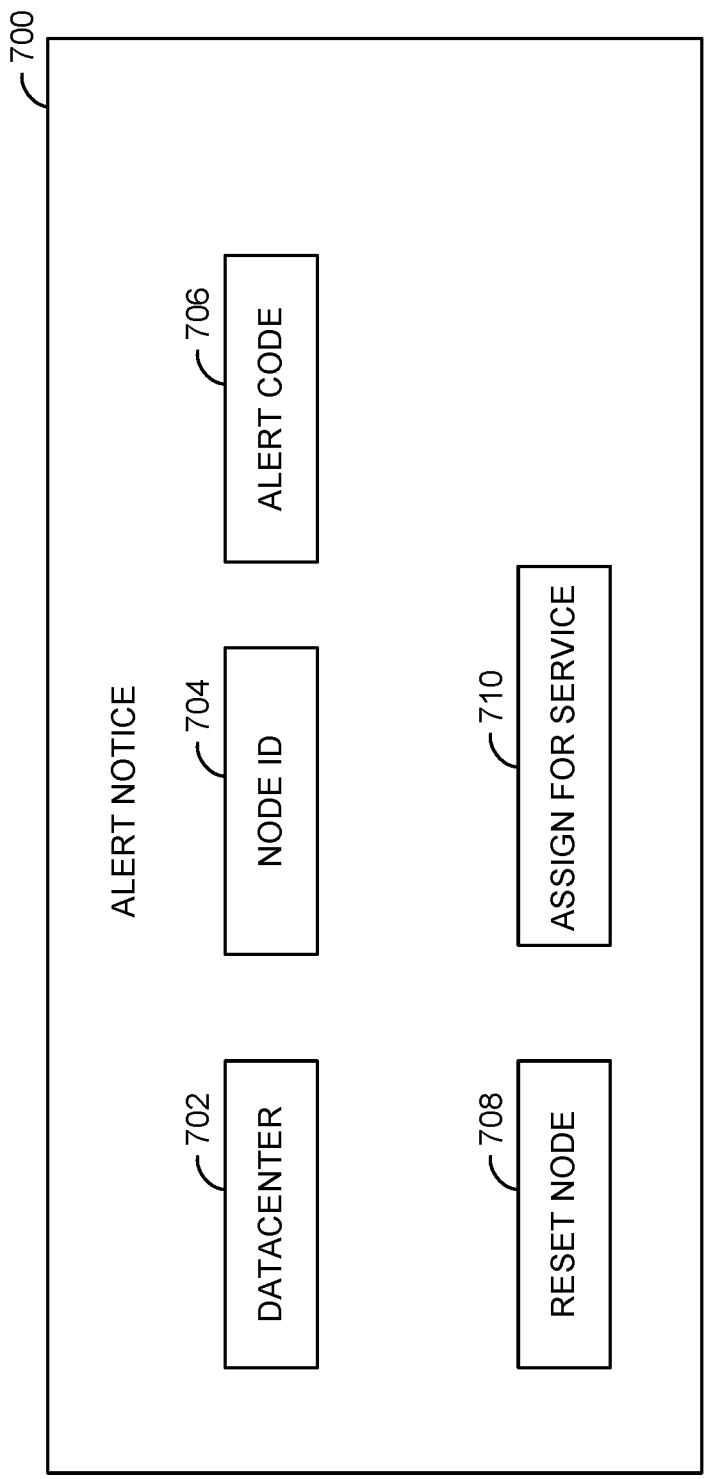
FIG. 7 illustrates an alert message in accordance with some embodiments.

FIG. 7 illustrates an alert interface 700 that may be displayed by monitoring server 102 or alert device 115, and which may display information from one of the alert messages 305 generated by one of the compute nodes 110 and transmitted to, and received by, monitoring server 102. In this example, alert interface 700 identifies the datacenter 702 (e.g., via a datacenter ID), the node ID 704 (e.g., node ID 350), and the alert code 706 (e.g., alert data 356). Further, alert interface 700 may include a reset node icon 708 and an assign for service icon 710. Upon engaging reset node icon 708, monitoring server 102 may transmit a reset message to the compute node 110 identified by node ID 704.

Once received, the reset message may cause the compute node to perform a reset. By resetting the compute node 110, the fault identified by the alert code 706 may be cured. Otherwise, if the user engages the assign for service icon 710, monitoring server 102 may generate a service request for the compute node 110. For example, the monitoring server 102 may generate and submit the service request within a service database maintained within database 116. In some examples, monitoring server 102 transmits a notification to one or more computing devices of one or more IT professionals. For example, monitoring server 102 may generate and transmit an email, a text message, or any other suitable message type indicating the node ID 704 and the alert code 706. The message, when received, may cause the computing devices of the IT professionals to display the notification. The IT professionals may then become aware of the issue, and may attempt to solve the issue with the compute node 110.

Figure 8A:
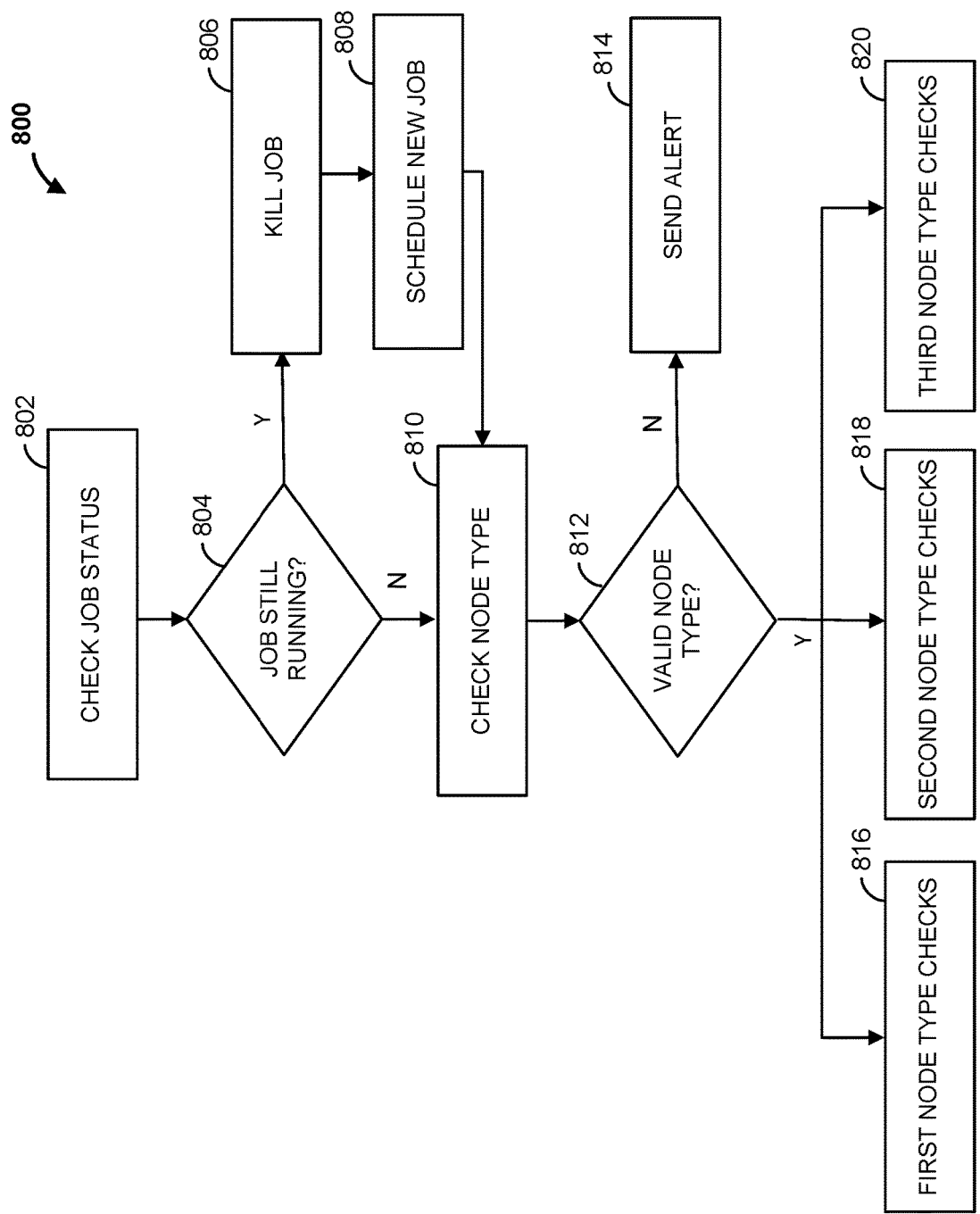
FIGS. 8A and 8B illustrate flowcharts of example methods that can be carried out by a node in accordance with some embodiments.

FIG. 8A illustrates a flowchart 800 of a method that may be performed by a compute node, such as compute node 110, when executing a monitoring script as described herein. Beginning at step 802, the compute node checks the job status of a previous job. At step 804, a determination is made as to whether the job is still executing (e.g., running). If the job is still executing, the method proceeds to step 806, where the job is terminated (e.g., killed). In some examples, the compute node 110 may generate an alert message 305 identifying that the previous job was terminated. The method then proceeds to step 810. The method then proceeds to step 808, where a new job is scheduled. If, however, at step 804, the job is not executing, the method proceeds to step 810.

At step 810, the compute node 110 checks its node type. For example, the compute node 110 may read a register, or read a value defining its node type from memory. At step 812, the compute node 110 determines whether the node type is valid. For example, the compute node 110 may compare its node type to one or more node types received within a monitoring package obtained during bootup.

For example, a received monitoring script may define controller, deployment, and compute node types, where nodes of each type perform particular operations. If the node type of the compute node 110 is not one of the controller, deployment, and compute node types, the executed monitoring script may send an alert at step 814, such as an alert message 305 identifying that the configured node type of the compute node 110 is invalid. In some examples, the compute node 110 also stops executing (e.g., exits) the monitoring script.

Otherwise, if the node type of the compute node 110 is one of the controller, deployment, and compute node types, the compute node 110 proceeds to perform one or more additional health checks based on the node type. For example, if the compute node's 100 node type is a first node type, the method proceeds to step 816, where one or more first node type health checks are performed. If, however, the compute node's 100 node type is a second node type, the method proceeds to step 818, where one or more second node type health checks are performed. If the compute node's 100 node type is a third node type, the method proceeds to step 820, where one or more third node type health checks are performed.

Figure 8B:
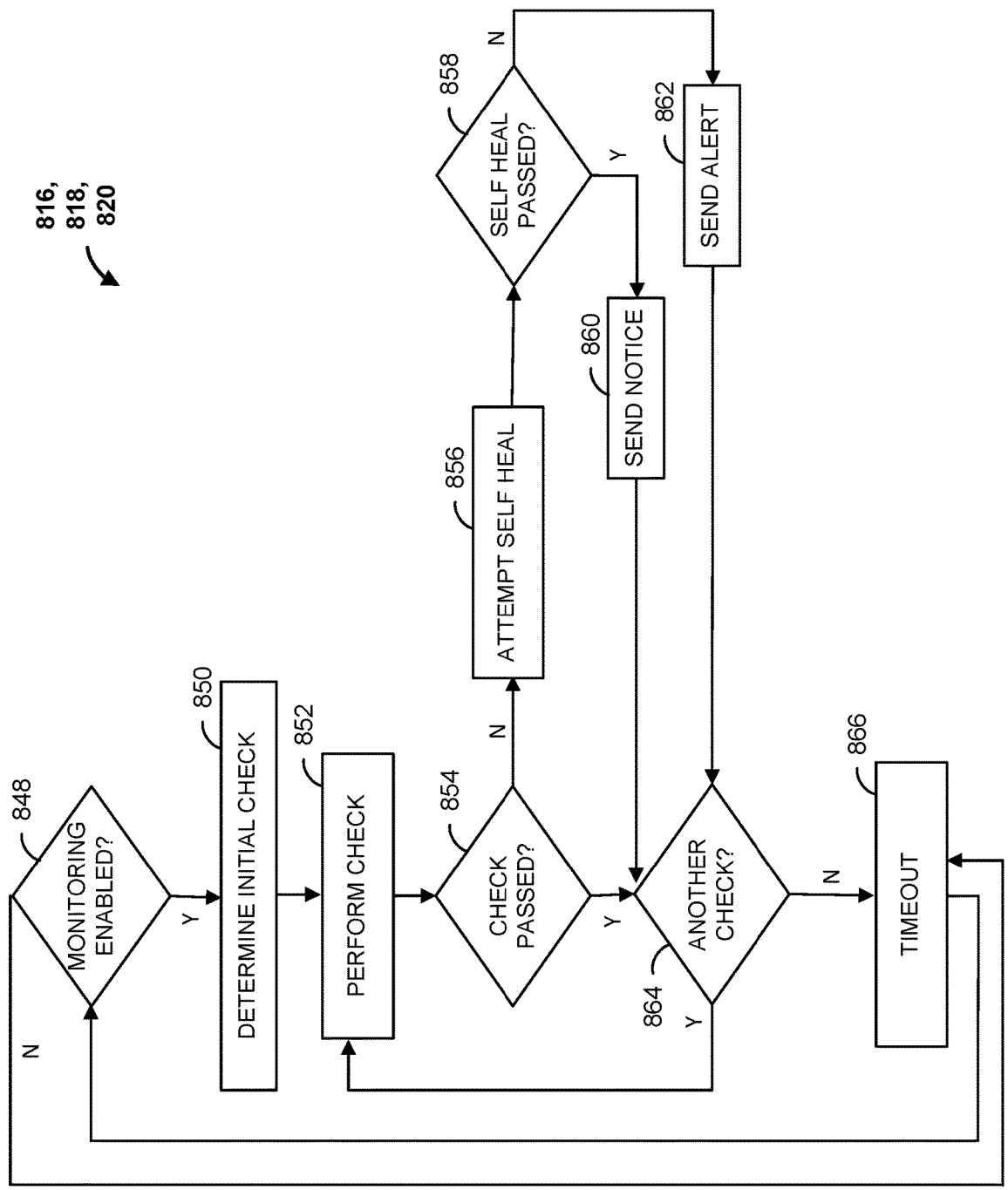

FIG. 8B illustrates an example of steps 816, 818, and 820 of FIG. 8A, which illustrate a method that may be performed by a compute node, such as compute node 110, when executing a monitoring script. The compute node 110 may execute an operating system (OS) that calls the monitoring script, for example. Beginning at step at step 848, compute node 110 may determine if monitoring is enabled. For example, compute node 110 may obtain a value stored in memory, such as a value in stored within a configuration file in memory (e.g., received as a file 362 or parameter 364), and determine, based on the value, whether a monitoring script should be executed. If, based on the value, the compute node 110 determines that the monitoring script is not to be executed, the method proceeds to step 866. If, however, the compute node 110 determines that the monitoring script is to be executed, the method proceeds to step 850. At step 850, an initial health check is determined. For example, the compute node 110 may execute the monitoring script, where an initial health check is performed first. The initial health check may be, for example, to determine the compute node's 110 node type, and determine if it's a valid node type, as described herein. At step 852, the health check is performed.

Proceeding to step 854, the compute node 110 determines if the health check passed. If the health check passes (e.g., the health check does not fail), the method proceeds to step 864. If, however, the health check does not pass (e.g., failure), the method proceeds to step 856, where the compute node 110 attempts to self-heal. For example, based on the health check that failed, the compute node 110 may perform operations to cure the failure, such as by restarting a process (e.g., program, script, etc.), by restarting, or by any other suitable self-heal operation.

At step 858, if the self-heal passed (e.g., the health check passed after attempting the self-heal operations), the method proceeds to step 860, where a notice is generated and transmitted to, for example, monitoring server 102. The notice may indicate the failing health check, and may further indicate that the failure was resolved. Upon receiving the notice, the monitoring server 102 may display the notice, and may further store the notice in a database, such as database 116 (e.g., the monitoring server 102 may log the notice). If, however, at step 858 the self-heal failed, the method proceeds to step 862 where an alert is generated and transmitted to, for example, monitoring server 102. The alert may be, for example, a corresponding alert message 305A, 305B, 305C, 305D, 305E, 305F. Upon receiving the notice, the monitoring server 102 may display the alert, and may further store the alert in a database, such as database 116 (e.g., the monitoring server 102 may log the alert). The method then proceeds to step 864.

At step 864, the compute node 110 determines if there is another health check to perform. If there is another health check to perform, the method proceeds back to step 852 to perform the health check. If, however, there is no other health check to perform, the method proceeds to step 866.

At step 866, the compute node 110 stops executing the monitoring script for a predetermined amount of time (e.g., such as one programmed into timer 405). For example, the OS may not call the monitoring script until the predetermined amount of time has passed. Once the predetermined amount of time has expired, the method proceeds back to step 848 to determine whether monitoring is enabled.

Figure 9:
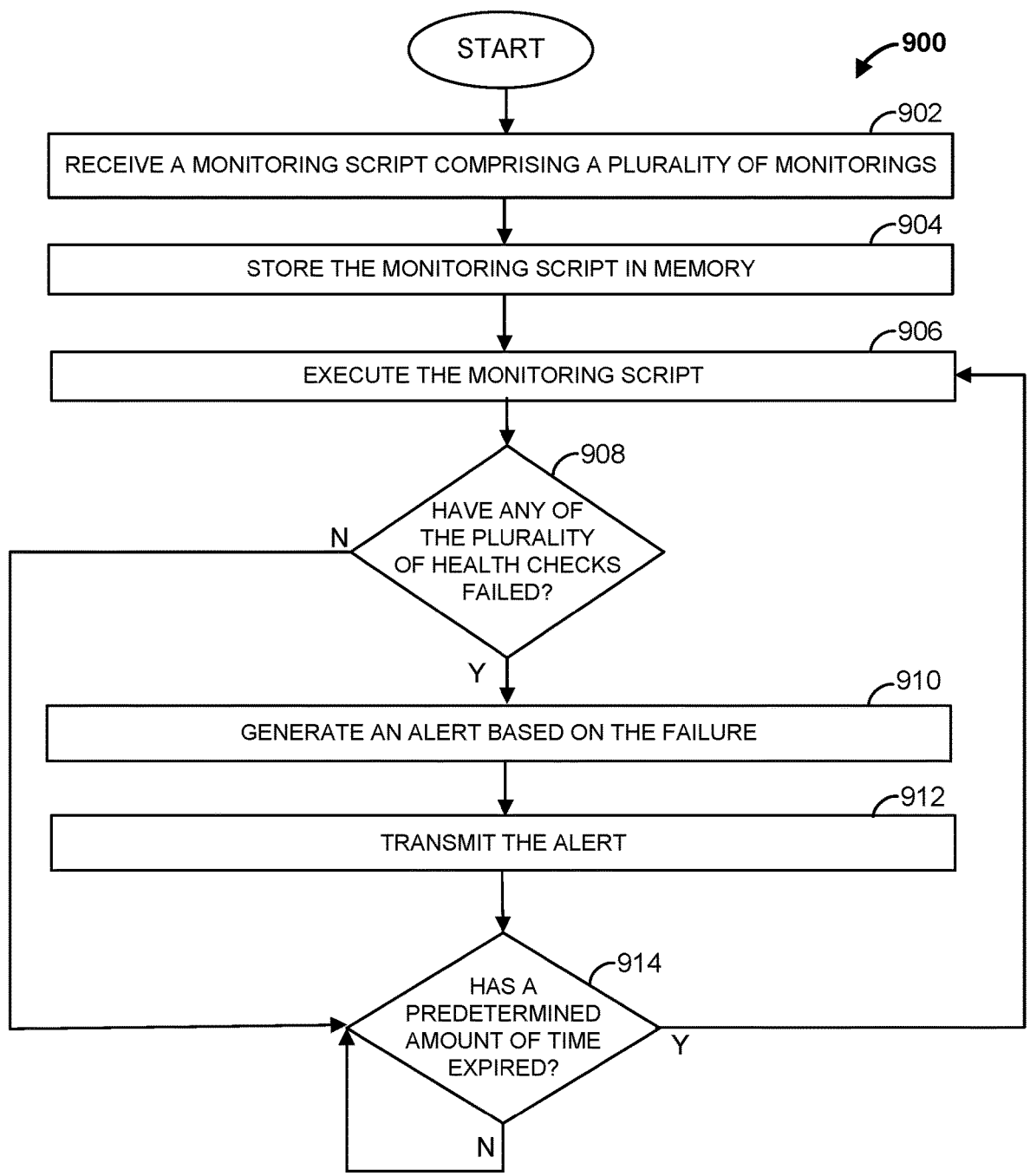
FIG. 9 illustrates a flowchart of another example method that can be carried out by a node in accordance with some embodiments.

FIG. 9 illustrates a flowchart 900 of a method that may be performed by a compute node, such as a compute node 110. At step 902, a monitoring script comprising a plurality of health checks is received. For example, the monitoring script may be requested and received during a bootup sequence of the compute node 110. As described herein, the health checks may include: checking whether a previous job is still executing, checking whether the compute node 110 is of a valid node type, determining whether all dependent files are available, determining whether node monitoring, or monitoring of any particular health check, is disabled, determining whether the node "uptime" is beyond a threshold, determining whether previous service processes are still executing, determining whether a file system is in a valid (e.g., read-only) state, determining whether CPU usage is beyond a threshold, whether enough disk space (e.g., memory) is available, determining whether disk usage is beyond a threshold, determining whether one or more services are executing, and determining container status, among other health checks.

At step 904, the compute node 110 stores the monitoring script in memory. For example, the compute node 110 may store the monitoring script within working memory 202. Further, at step 906, the compute node 110 executes the monitoring script.

Proceeding to step 908, the compute node 110 determines whether any of the plurality of health checks failed. For example, the compute node 110 may perform operations to execute each health check, and determines whether each health check failed. If a health check has failed, the method proceeds to step 910, where an alert is generated based on the failure. For example, the compute node 110 may generate a corresponding alert message 305A, 305B, 305C, 305D, 305E, 305F. The method then proceeds to step 912, where the alert is transmitted. For example, the compute node 110 may transmit the alert to monitoring server 102. Monitoring server 102 may transmit a notification (e.g., alert notice 320) to one or more alert devices 114 based on the received alert, and monitoring server 102 may display the alert. The method proceeds to step 914 from step 912. If, however, at step 908 no health checks fail, the method proceeds to step 914.

At step 914, a determination is made as to whether a predetermined amount of time has expired. For example, the compute node 100 may initialize the timer 405 the predetermined amount of time, and may start the time 405. Upon expiration of the predetermined amount of time, the timer 405 may expire, and issue an interrupt, which causes an interrupt service routine (ISR) to execute. The ISR may toggle a flag value, indicating that the time has expired. The OS may periodically check the flag to determine when the predetermined amount of time has expired. Once the predetermined amount of time has expired, the method proceeds back to step 906, where the monitoring script is executed.

Figure 10:
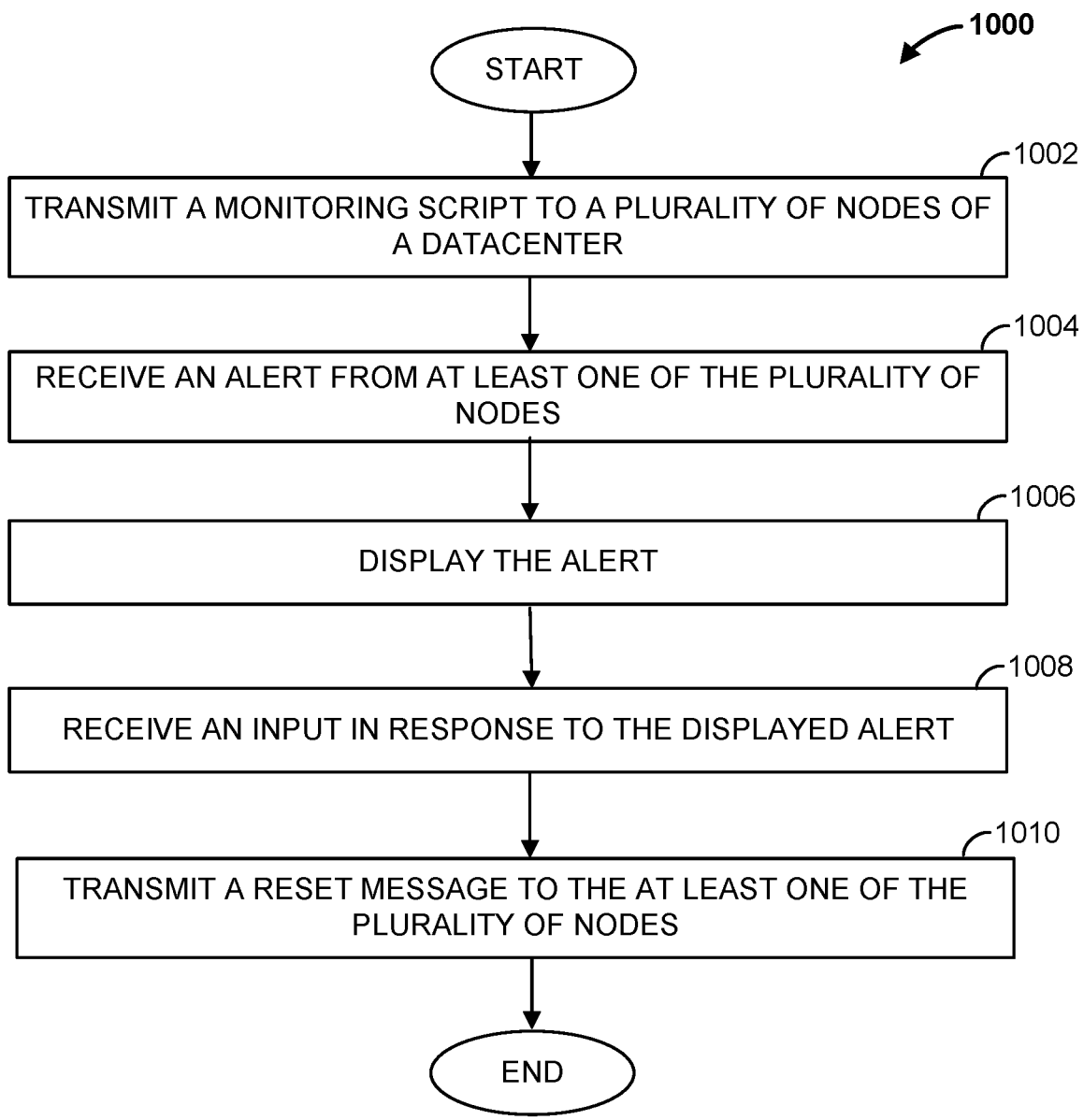
FIG. 10 illustrates a flowchart of an example method that can be carried out by a monitoring server in accordance with some embodiments.

FIG. 10 illustrates a flowchart 1000 of a method that can be carried out by a computing device, such as the monitoring server 102. Beginning at step 1002, the monitoring server 110 transmits a monitoring script to a plurality of nodes (e.g., compute nodes 110) of a datacenter (e.g., datacenter 108A, 108B). At step 1004, the monitoring server 102 receives an alert from at least one of the plurality of nodes. For example, the monitoring server 102 may receive, from a compute node 110A, 110B, 110C, 110D, 110E, 110F, a corresponding alert message 305A, 305B, 305C, 305D, 305E, 305F if one or more of health checks performed by the executed monitoring script fail.

Proceeding to step 1004, the monitoring server 102 displays the alert. For example, the monitoring server 102 may generate an alert notice 700 based on the received alert message 305, and may display the alert notice 700. At step 1006, the monitoring server 102 receives an input in response to the displayed alert. For example, the monitoring server 102 may receive an input via user interface 205 indicating that the reset node icon 708 has been engaged (e.g., touched). At step 1008, the monitoring server 102 transmits a reset message to the at least one of the plurality of nodes. The reset message causes the at least one of the plurality of nodes to reset (e.g., bootup), which may cure the failure. The method then ends.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
a computing device configured to:
  display, via a user interface, a visual indication of a plurality of nodes;
  receive, via the user interface, a selection of a subset of the plurality of nodes;
  upon receipt of the selection of the subset, receive a monitoring file comprising a plurality of health checks, the plurality of health checks being associated with the subset of the plurality of nodes;
  execute the monitoring file based on a type associated with the computing device;
  based on the execution of the monitoring file, compare one or more node attributes to a predetermined threshold to generate a comparison and identify a failed health check of the plurality of health checks, wherein the failed health check is associated with a failed node of the subset of the plurality of nodes and the one or more node attributes include an uptime of a computer node, a load average of the computer node, CPU usage, disk space usage, and memory usage;
  in response to identifying the failed health check, generate an alert message based on the comparison, the alert message identifying the failed node and data associated with the failed health check;
  transmit the alert message to a monitoring computing device;
  receive, in response to transmitting the alert message, a reset request from the failed node; and
  transmit a reset command to the failed node, the reset command causing the failed node to reset.

2. The system of claim 1, wherein executing the monitoring file comprises:
determining whether each of the plurality of health checks are enabled; and executing each of the plurality of health checks when they are enabled.

3. The system of claim 1, wherein the computing device is configured to, in response to identifying the failed health check of the plurality of health checks, execute the a failed health check after a predetermined amount of time.

4. The system of claim 1, wherein the computing device is configured to:
initialize a timer with a predetermined amount of time;
determine when the predetermined amount of time has passed based on the timer; and
in response to the determining that the predetermined amount of time has passed, execute the monitoring file.

5. The system of claim 1, wherein the computing device is configured to:
determine that a first of the plurality of health checks passed; and
based on the determination, execute a second of the plurality of health checks.

6. The system of claim 1, wherein the computing device is configured to:
determine that a first of the plurality of health checks failed; and
terminate the monitoring file.

7. The system of claim 1, wherein the computing device is configured to:

determine that the type associated with the computing device does not match any of a plurality of types identified within the monitoring file;
generate a second alert message identifying the type associated with the computing device; and
transmit the second alert message.

8. The system of claim 1, wherein the computing device is configured to:
receive a message identifying a disabled one of the plurality of health checks; and
execute the monitoring file without executing the disabled one of the plurality of health checks.

9. The system of claim 1, wherein the computing device is configured to:
in response to identifying the failed health check of the plurality of health checks, execute a self-heal operation at the failed node; and
upon execution of the self-heal operation, executing a subsequent health check at the failed node.

10. A method comprising:
displaying, via a user interface, a visual indication of a plurality of nodes;
receiving, via the user interface, a selection of a subset of the plurality of nodes;
upon receipt of the selection of the subset, receiving a monitoring file comprising a plurality of health checks, the plurality of health checks being associated with the subset of the plurality of nodes;
executing the monitoring file based on a type associated with a computing device;
based on the execution of the monitoring file, comparing one or more node attributes to a predetermined threshold to generate a comparison and identifying a failed health check of the plurality of health checks, wherein the failed health check is associated with a failed node of the plurality of nodes and the one or more node attributes include an uptime of a computer node, a load average of the computer node, CPU usage, disk space usage, and memory usage;
in response to identifying the failed health check, generating an alert message based on the comparison, the alert message identifying the failed node and data associated with the failed health check;
transmitting the alert message to a monitoring computing device;
receiving, in response to transmitting the alert message, a reset request from the failed node; and
transmitting a reset command to the failed node, the reset command causing the failed node to reset.

11. The method of claim 10 further comprising:
determining whether each of the plurality of health checks are enabled; and executing each of the plurality of health checks when they are enabled.

12. The method of claim 10 further comprising, in response to identifying the failed health check of the plurality of health checks, executing the failed health check after a predetermined amount of time.

13. The method of claim 10 further comprising:
initializing a timer with a predetermined amount of time; and
determining when the predetermined amount of time has passed based on the timer; and in response to the determining that the predetermined amount of time has passed, executing the monitoring file.

14. The method of claim 10 further comprising:
determining that a first of the plurality of health checks passed; and
based on the determination, executing a second of the plurality of health checks.

15. The method of claim 10 further comprising:
determining that a first of the plurality of health checks failed; and
terminating the monitoring file.

16. The method of claim 10, further comprising:
determining that the type associated with the computing device does not match any of a plurality of types identified within the monitoring file;
generating a second alert message identifying the type associated with the computing device; and
transmitting the second alert message.

17. The method of claim 10, further comprising: receiving a message identifying a disabled one of the plurality of health checks; and
executing the monitoring file without executing the disabled one of the plurality of health checks.

18. A non-transitory computer readable medium having instructions stored thereon, wherein the instructions, when executed by at least one processor, cause a device to perform operations comprising:
displaying, via a user interface, a visual indication of a plurality of nodes;
receiving, via the user interface, a selection of a subset of the plurality of nodes;
upon receipt of the selection of the subset, receiving a monitoring file comprising a plurality of health checks, the plurality of health checks being associated with the subset of the plurality of nodes;
executing the monitoring file based on a type associated with a computing device;
based on the execution of the monitoring file, comparing one or more node attributes to a predetermined threshold to generate a comparison and identifying a failed health check of the plurality of health checks, wherein the failed health check is associated with a failed node of the plurality of nodes and the one or more node attributes include an uptime of a computer node, a load average of the computer node, CPU usage, disk space usage, and memory usage;
in response to identifying the failed health check, generating an alert message based on the comparison, the alert message identifying the failed node and data associated with the failed health check;
transmitting the alert message to a monitoring computing device;
receiving, in response to transmitting the alert message, a reset request from the failed node; and
transmitting a reset command to the failed node, the reset command causing the failed node to reset.

19. The non-transitory computer readable medium of claim 18 further comprising instructions stored thereon that, when executed by at least one processor, further cause the device to perform operations comprising:
determining whether each of the plurality of health checks are enabled; and
executing each of the plurality of health checks when they are enabled.

* * * * *